United States Patent [19]

Reistad

[11] 4,160,366
[45] Jul. 10, 1979

[54] ABSORPTION REFRIGERATING APPARATUS

[75] Inventor: Bengt R. Reistad, Bromma, Sweden

[73] Assignee: Aktiebolaget Electrolux, Stockholm, Sweden

[21] Appl. No.: 811,282

[22] Filed: Jun. 29, 1977

[30] Foreign Application Priority Data

Jul. 8, 1976 [SE] Sweden .............................. 7607802

[51] Int. Cl.² .................... F25B 15/00; F25B 33/00
[52] U.S. Cl. .................................... 62/476; 62/495
[58] Field of Search ................ 62/476, 148, 495, 497

[56] References Cited

U.S. PATENT DOCUMENTS

| | | | |
|---|---|---|---|
| 2,339,817 | 1/1944 | Roth | 62/495 |
| 3,038,321 | 6/1962 | Merrick | 62/495 |
| 3,254,507 | 6/1966 | Whitlow | 62/476 |
| 3,368,367 | 2/1968 | Merrick | 62/476 |

Primary Examiner—Lloyd L. King
Attorney, Agent, or Firm—Alfred E. Miller

[57] ABSTRACT

An absorption refrigeration apparatus provided with a single pipe boiler system having a pump and a standpipe containing a rectifier, and a boiler, with the latter having heat supplied to it. The arrangement permits one to choose a more favorable reaction ratio of the pump in the apparatus, or the absorber vessel can be placed at a lower level, with one choice resulting in a lower consumption of energy, and the other choice a greater cooling effect.

7 Claims, 4 Drawing Figures

ABSORPTION REFRIGERATING APPARATUS

BACKGROUND OF THE INVENTION

The present invention relates to an absorption refrigerating apparatus and particularly to a boiler system therein having a pump and a standpipe containing a rectifier. The invention includes a part to which heat is supplied and which constitutes the boiler of the apparatus.

Prior art boilers of the type referred to above have the tendency to show variations in the liquid level in the standpipe. In order to provide for the proper operation of the apparatus, it is customary to arrange the outlet of the pump at a higher level than would be theoretically necessary for normal operation of the absorption refrigerating apparatus.

Single pipe boilers, such as contemplated in the present invention, are of simple construction which makes them inexpensive to manufacture. Furthermore, the extension of the boilers in a horizontal plane is small and thus only a limited amount of heat insulation against the ambient is required. However, in spite of the simple construction, certain difficulties arise with the apparatus. For example, in the boiler part, considerable quantities of vapor bubbles are formed which rise through the rectifier in the standpipe surrounding the pump pipe. Thus, a column is formed which contains liquid and a comparatively large quantity of vapor and has such a height that the liquid surface will be located at a higher level in the apparatus than the level to which the weak solution in the system has to be lifted by the boiler pump to overcome the flow resistance and to be elevated above the inlet to the absorber. Therefore, with a normal pump, the liquid may rise above the opening of the pump and affect the operation of the pump in an unfavorable manner. Because of this situation, the pump pipe must be extended to that its opening will be located higher in the apparatus, and even though the aforementioned disadvantage of the high liquid level in the standpipe is overcome in this way, the operating conditions of the pump are impaired because the liquid must be pumped to a higher level than required for the intended liquid circulation in the apparatus.

It is, therefore, an object of the present invention to provide an absorption refrigerating apparatus provided with a boiler system of the type hereinabove disclosed which overcomes the drawbacks of the said known arrangement.

Another object of the present invention is to provide an absorption refrigerating apparatus having a boiler system as hereinabove disclosed in which a flow path provided for the liquid lifted by the pump opens into the standpipe at a point between the rectifier and the boiler.

It is a further object of the present invention to provide an arrangement in which a choice can be made resulting in the lower consumption of energy at a given cooling effect or the use of a larger absorber which results in a greater cooling effect.

In order that the invention will be more clearly understood, it will now be disclosed in greater detail with reference to the accompanying drawings, in which.

DESCRIPTION OF THE PREFERRED EMBODIMENT

Figure 1:
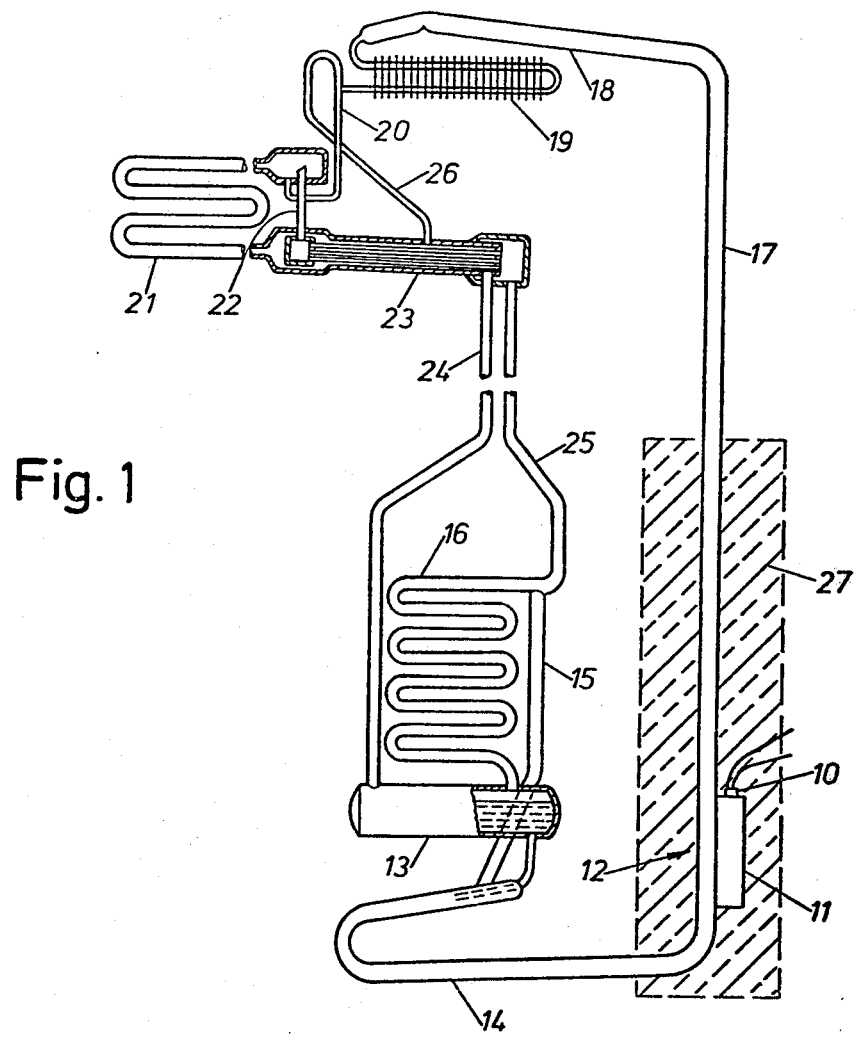
FIG. 1 is a diagrammatic view of an absorption refrigerating apparatus provided with a single pipe boiler and construction and arranged in accordance with the teachings of the present invention.

Referring to FIG. 1, an absorption refrigerating apparatus is shown in which an electric heating cartridge 10 enclosed in a sleeve 11 is heat conductively connected by means of a weld or the like to the boiler 10 of the apparatus. The present refrigerating apparatus is charged with water, ammonia and hydrogen gas as absorption medium, refrigerant and pressure equalizing inert gas respectively. An absorber vessel 13 is shown having an absorption solution which is rich in refrigerant and flows from said vessel through an inner conduit of the liquid heat exchanger 14 to a boiler 12. In the latter, the refrigerant vapor is expelled or driven off from the solution, with the latter being simultaneously lifted to such a level in an inner standpipe that the solution can flow by gravity to the absorber 16 of the apparatus to the outer conduit of the liquid heat exchanger. Said outer conduit extends upwardly through another conduit 15.

The refrigerant vapor as well as the vapor of the absorption medium expelled in the boiler 12 are conducted by way of a vapor conduit 17 to a water separator 18 and then into a finned condenser 19. The refrigerant condensate is led away from the finned condenser by way of a conduit 20 into the upper part of an evaporator 20 in which a refrigerant evaporates, while generating cold, into weak inert gas supplied by a conduit 22. The gas mixture present in the evaporator 21 is conducted into a gas heat exchanger 23 and by way of a conduit 24 to a gas space in the absorber vessel 13. Thus, the gas, rich in refrigerant, flows upwardly through the absorber 16, the refrigerant vapor being absorbed by the weak absorption solution supplied thereto. When the solution has passed through the absorber and become enriched in refrigerant it is collected in the absorber vessel 13. Furthermore, the gas is weak in refrigerant vapor after having passed through the absorber 16. It is thence conducted through a conduit 25 to the gas heat exchanger 23 to be supplied to the evaporator 21 by way of a conduit 22. The gas mixture from the evaporator 21 is conducted into a gas heat exchanger 23 and to a gas space in the absorber vessel 13 by means of a conduit 24. Thus, the gas, rich in refrigerant, flows upwardly through the absorber 16 and the refrigerant vapor is absorbed by the weak absorption solution supplied to the apparatus. The solution is collected in the absorber vessel 13 when it has passed through the absorber and become enriched in refrigerant. However, the gas is weak in refrigerant vapor and is conducted through conduit 25 to the gas heat exchanger 23 to be supplied to the evaporator 21 by way of the conduit 22 after it has passed through the absorber 16. Furthermore, a vent conduit 26 is located between the outlet side of the condenser 19 and a rich gas conduit of the gas heat exchanger 23. It is also to be noted that the boiler 22 is surrounded by heat insulation 27 as clearly shown in FIG. 1.

Figure 2:
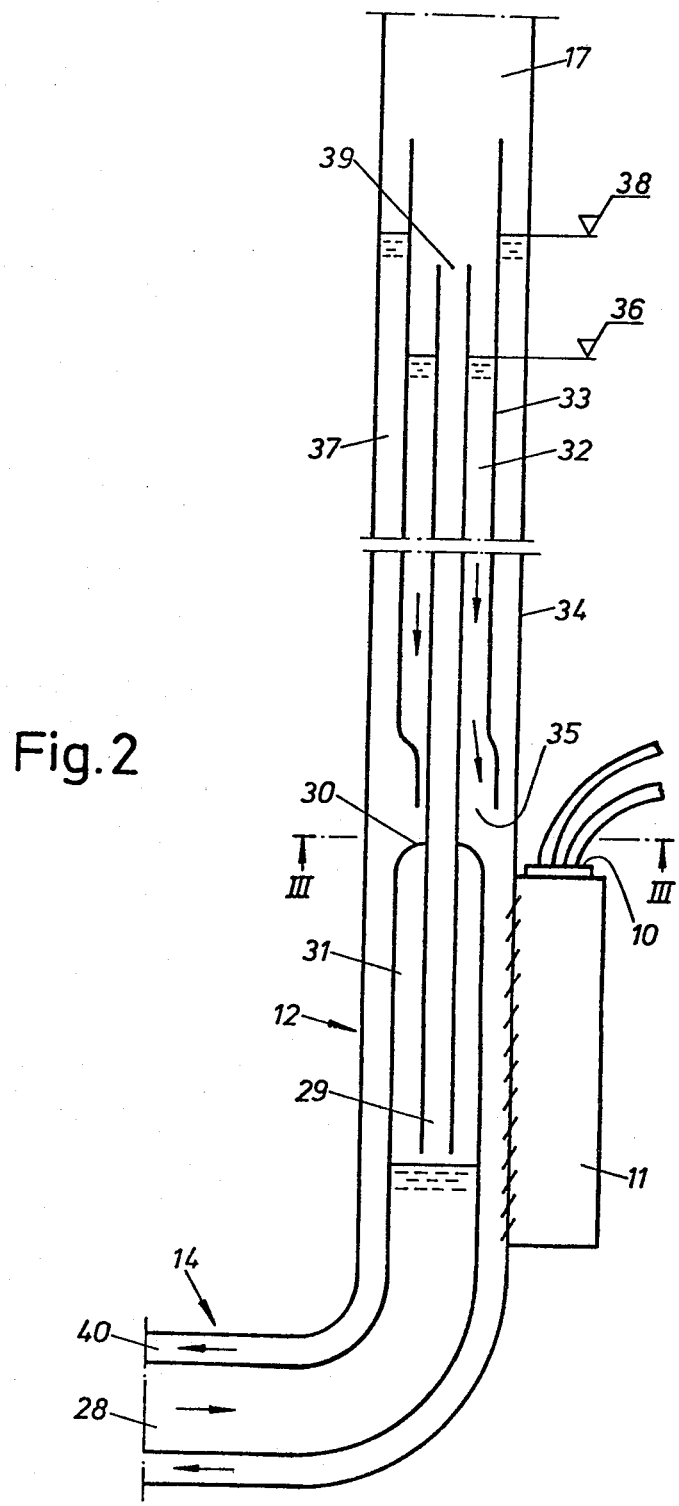
FIG. 2 is a vertical section, on an enlarged scale of the boiler part of the apparatus shown in FIG. 1.

Referring now to FIG. 2, the boiler operates in the following manner: A rich solution is supplied by the inner conduit 28 of the liquid heat exchanger 14, which conduit surrounds inner pipe 29 which closes off the conduit around the pump pipe 29 at a level 30. Therefore, a vapor dome 31 is formed about the lower part of the pump pipe. Heat supplied by the heating cartridge 10 causes vapor to be formed in the rich solution so that the pressure increases in the vapor dome 31 and the liquid level therein is forced downwardly toward the lower opening of the pump pipe. Because of this vapor pressure, and due to the fact that there is a higher liquid column on the other side of the heat exchanger in the absorber vessel 13, a certain amount of vapor and solution will be lifted in the pump pipe 29. The vapor continues to rise through the vapor part 17 whereupon the lifted liquid is collected in a conduit 32 which surrounds the pump pipe 29 and is formed between the pump pipe 29 and the pipe 33, with the latter pipe being positioned concentrically about the former. It will be observed that the lower end of the pipe 33 is open so that the elevated solution can flow into the outer pipe 34 of the boiler at a place 35 situated between that part of the outer pipe 34 to which heat is supplied at its lower part and which constitutes a boiler and a part situated higher in elevation, said latter part extending upwardly to the liquid level 36 which is maintained in the conduit 32 by the solution lifted by the pump. Thus, the elevated solutions supplies heat continuously to a rectifier 37 and there is a supply of heat from the solution in the conduit 32 to the contents of the rectifier 37.

It will be evident that the lower opening at the place 35 of the conduit 32 has a very restricted area to permit mainly solution to flow out and prevent vapors formed in the boiler from entering the conduit 32. The vapors are instead caused to pass outside of the conduit 32 through the rectifier 37. Consequently, during operation of the present apparatus there are relatively large quantities of vapor in the solution in the rectifier 37 and the consequence is that the liquid in the rectifier reaches a level 38 that is higher than the level 36 in the conduit 32. Furthermore, it may even occur that the level 38 is higher than the upper opening 39 of the pump pipe 29. The height position of the upper opening 39 is limited to what is required for the lifted solution to be supplied to the conduit 32 above the level 36. This level 36 must be maintained and upheld to permit the solution to flow by gravity into the absorber 16. Therefore, the pipe 33 is extended upwardly a little above the level 38 which, with some variations, is maintained during operation of the apparatus. Moreover the pipe 33 can be extended upwardly without affecting the operation of the apparatus and in this manner it is possible to let the apparatus operate with two different liquid levels 36 and 38 with the solution passing from the rectifier 37 through the boiler 12 and an outer conduit 40 of the liquid heat exchanger 14 and the conduit 15 to the absorber 16.

Figure 3:
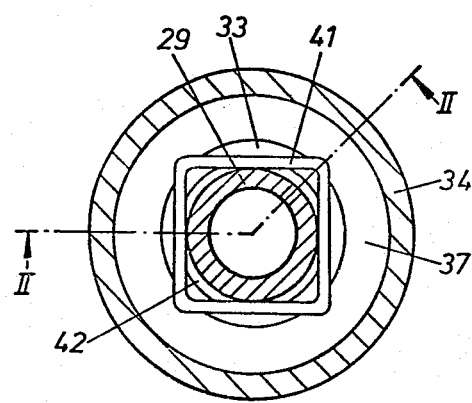
FIG. 3 is a horizontal sectional view taken along the lines 3—3 of FIG. 2 and viewed in an upward direction and FIG. 4 is a partial sectional and a partial elevational view of a modification of the details of the apparatus shown in FIG. 1.
Figure 4:
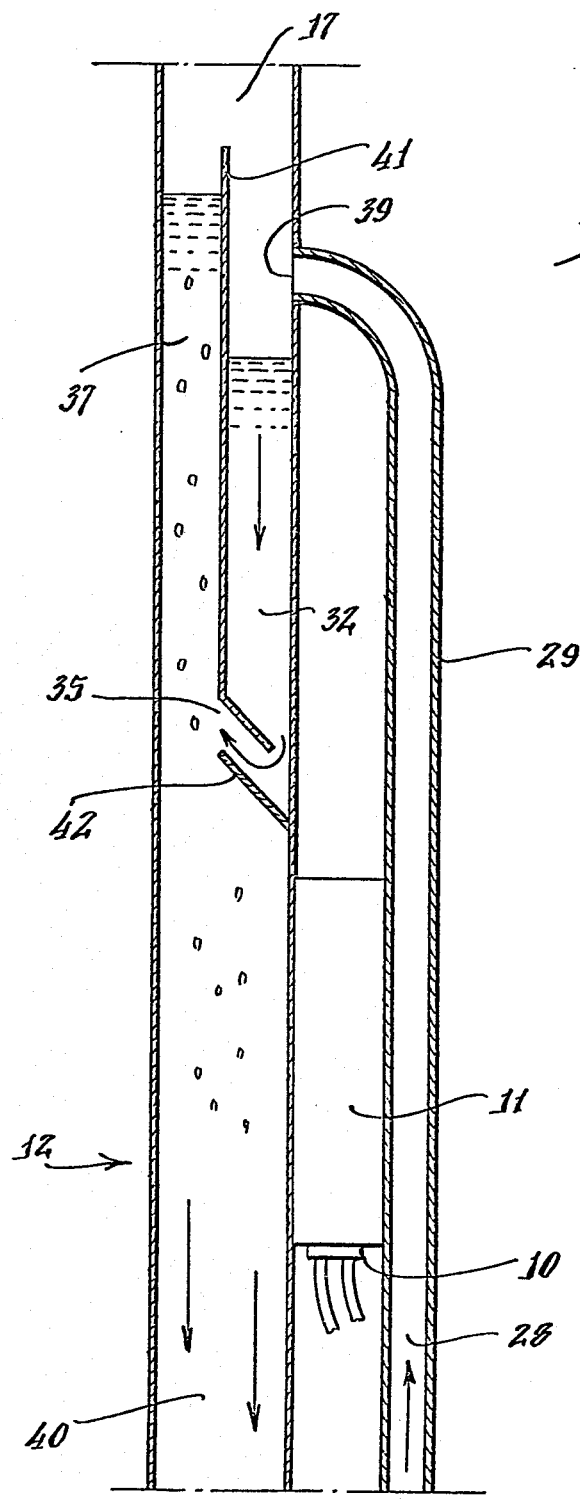

A study of FIG. 2 will show the pipe 33 has an asymmetrical lower end through which the solution flows into the boiler. However, FIG. 3 shows, in particular, an example of a suitable embodiment of the lower end of pipe 33. This end is squeezed together to form a configuration of a square 41 which abuts the pump pipe 29 but has four edge portions 42 which are open to thereby permit liquid to flow out of the pipe 33. However, the connection between the conduit 32 and the liquid in the standpipe can be made in other ways providing that the vapor bubbles formed in the boiler 12 below the passage 35 from conduit 32 will pass upwardly through the rectifier 37 and not through the conduit 32. Thus, another embodiment of the invention is shown in FIG. 4, which is related to another type of boiler construction with direct heating of the pump pipe 29. Liquid is supplied to the pump pipe 29 from the liquid heat exchanger through conduit 28 and lifted to the pump exit 39, where the liquid is delivered to the standpipe, whereas the vapor from the pump is conducted through the vapor conduit 17 to the condenser. As seen in FIG. 4, an electric heating element 10 is arranged in a sleeve 11 that is heat conductively connected to the pump pipe 29 and to the boiler part 12 of the standpipe. The upper part of the standpipe is divided by a separating wall 41 into a conduit 32 and a rectifier part 37 of the standpipe. Below the wall 41 and the conduit 32 a guiding plate 42 is arranged to conduct vapors generated in the boiler part 12 up into the rectifier 37 and preventing vapors from entering conduit 32. In this embodiment liquid can flow out from conduit 32, whereas vapor flowing upwardly and formed under the guiding plate 42 is guided into the rectifier 37. It should be apparent that other modifications of the apparatus are possible within the scope and intent of the invention.

The objective of the present invention is to insure operation of an absorption refrigerating apparatus with a single pipe boiler without the need for extending the pump pipe and without the resulting unfavorable consequences of the prior art structures. The desirable consequence of applicant's construction is that the pump does not have to lift the liquid as much as in the case of an extended pump pipe can be readily appreciated. For example, in applicant's construction, one can choose either to let the apparatus operate with a more favorable reaction ratio of the pump or the absorber vessel can be placed at a lower level. In the first case, the result will be a lower consumption of energy at a given cooling effect, and in the other case, the height space gained can be used to accommodate a larger absorber resulting in a greater cooling effect. Furthermore, the boiler will be less sensitive to variations in the energy supplied in the present construction

What is claimed:

1. An absorption refrigerating apparatus comprising a boiler system including a pump for the liquid solution therein, a standpipe, said standpipe containing a rectifier, means for supplying heat to said boiler, a flow path provided for the liquid lifted by said pump and opening into said standpipe at a location between said rectifier and said boiler, a pump pipe located within said standpipe for the weak absorption solution supplied by said pump, and a liquid collecting conduit surrounding said pump pipe whereby a flow path is formed therein, the lower end of said conduit communicating with said standpipe, and said liquid collecting conduit being open at its upper end and extending to a plane above the upper opening of said pump pipe.

2. An absorption refrigerating apparatus comprising a boiler system including a pump for the liquid solution therein, a standpipe, said standpipe containing a rectifier, means for supplying heat to said boiler, a flow path provided for the liquid lifted by said pump and opening into said standpipe at a location between said rectifier and said boiler, wherein said flow path includes a liquid collecting conduit, said rectifier being positioned juxtaposed to said liquid collecting conduit and in heat exchanging relationship therewith, said pump pipe being provided with a guiding plate adjacent to the opening of said flow path out of said liquid collecting conduit which prevents rising vapor bubbles in the system from passing into said conduit.

3. An absorption refrigerating apparatus operating with a refrigerant, an absorption medium, and a pressure equalizing gas comprising: a boiler system including a pump for the liquid solution therein, a standpipe, said standpipe containing a rectifier, means for supplying heat to said boiler, a flow path provided for the liquid lifted by said pump and opening into said standpipe at a location between said rectifier and said boiler, said flow path including a liquid collection conduit, said rectifier being positioned juxtaposed to said liquid collecting conduit and in heat exchanging relationship therewith, and a liquid collecting conduit being provided with an end having a construction that is so formed and arranged to prevent rising vapor bubbles in the system from passing into said conduit.

4. The combination as claimed in claim 3 wherein the rectifier forms a jacket around said conduit that surrounds said pump pipe.

5. The combination as claimed in claim 4 wherein a part of the conduit positioned inside said rectifier has a compressed lower end forming a small outlet for liquid, but substantially preventing vapor from flowing into the interior of said conduit.

6. The combination as claimed in claim 5 wherein said small outlet is of a substantially square form.

7. The combination as claimed in claim 5 wherein said vapor flows outside said conduit and into said rectifier.

* * * * *